May 27, 1924.
A. DAVIS, JR., ET AL
LIQUID MEASURING APPARATUS
Filed Sept. 14, 1920
7 Sheets-Sheet 1
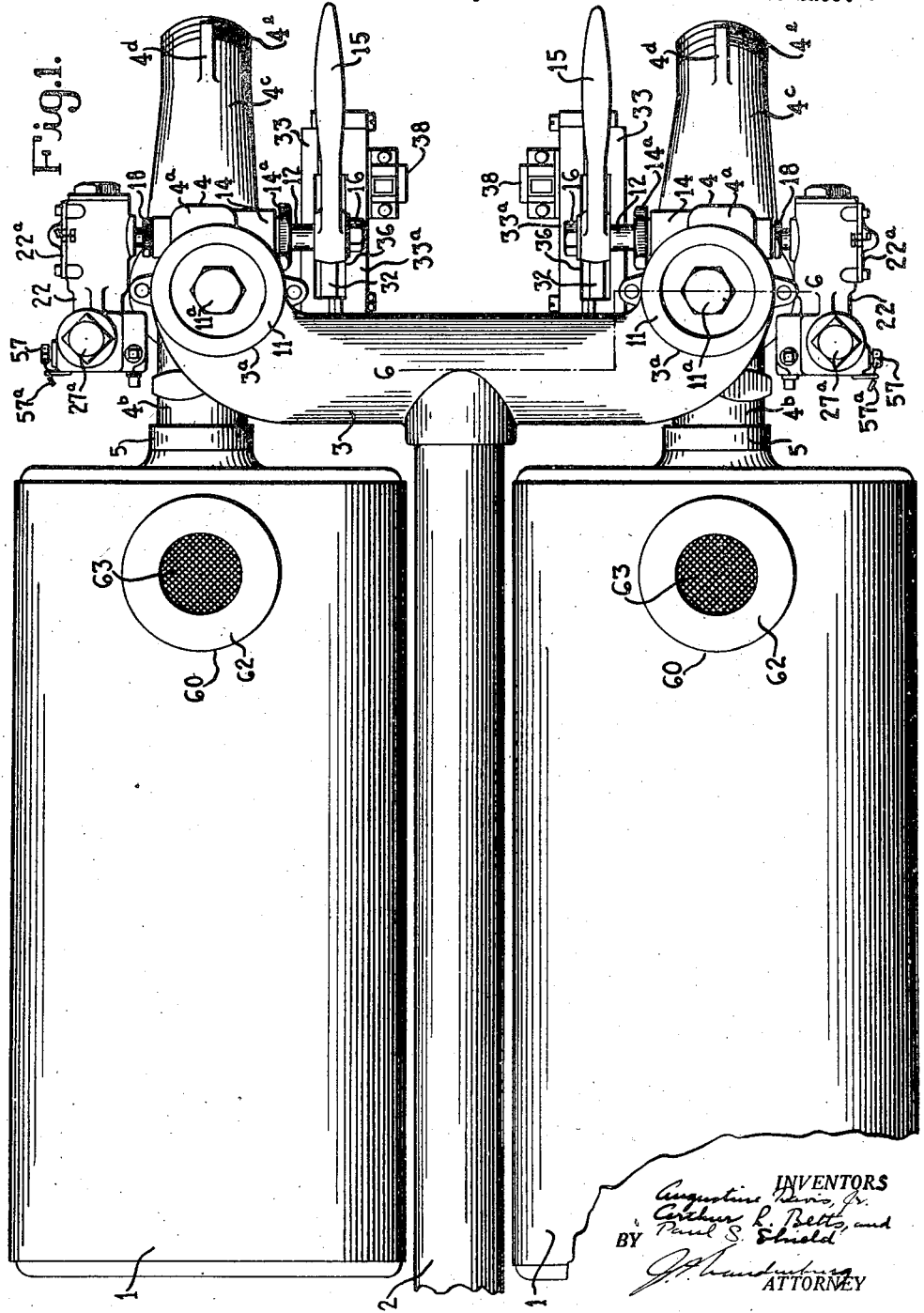

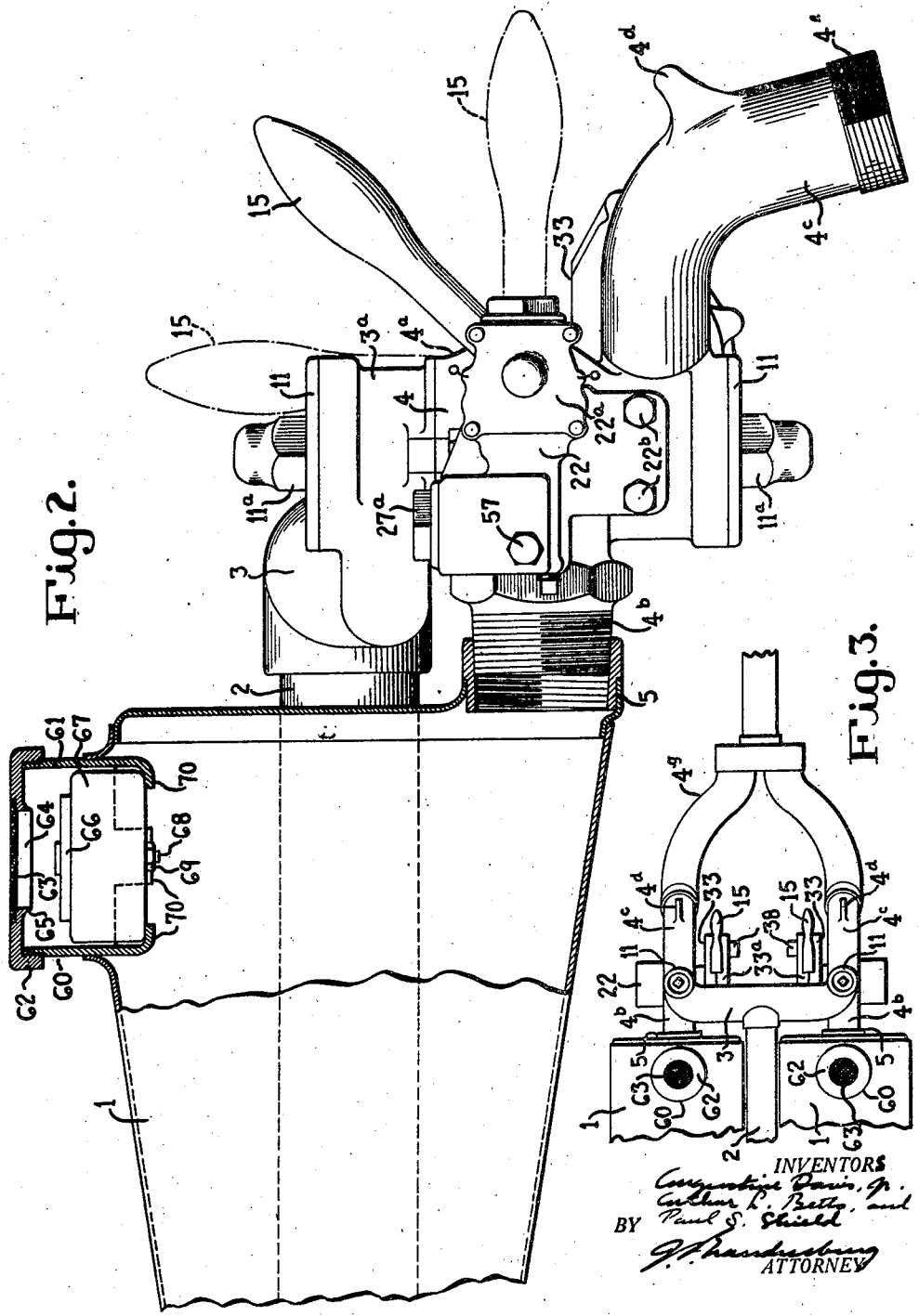

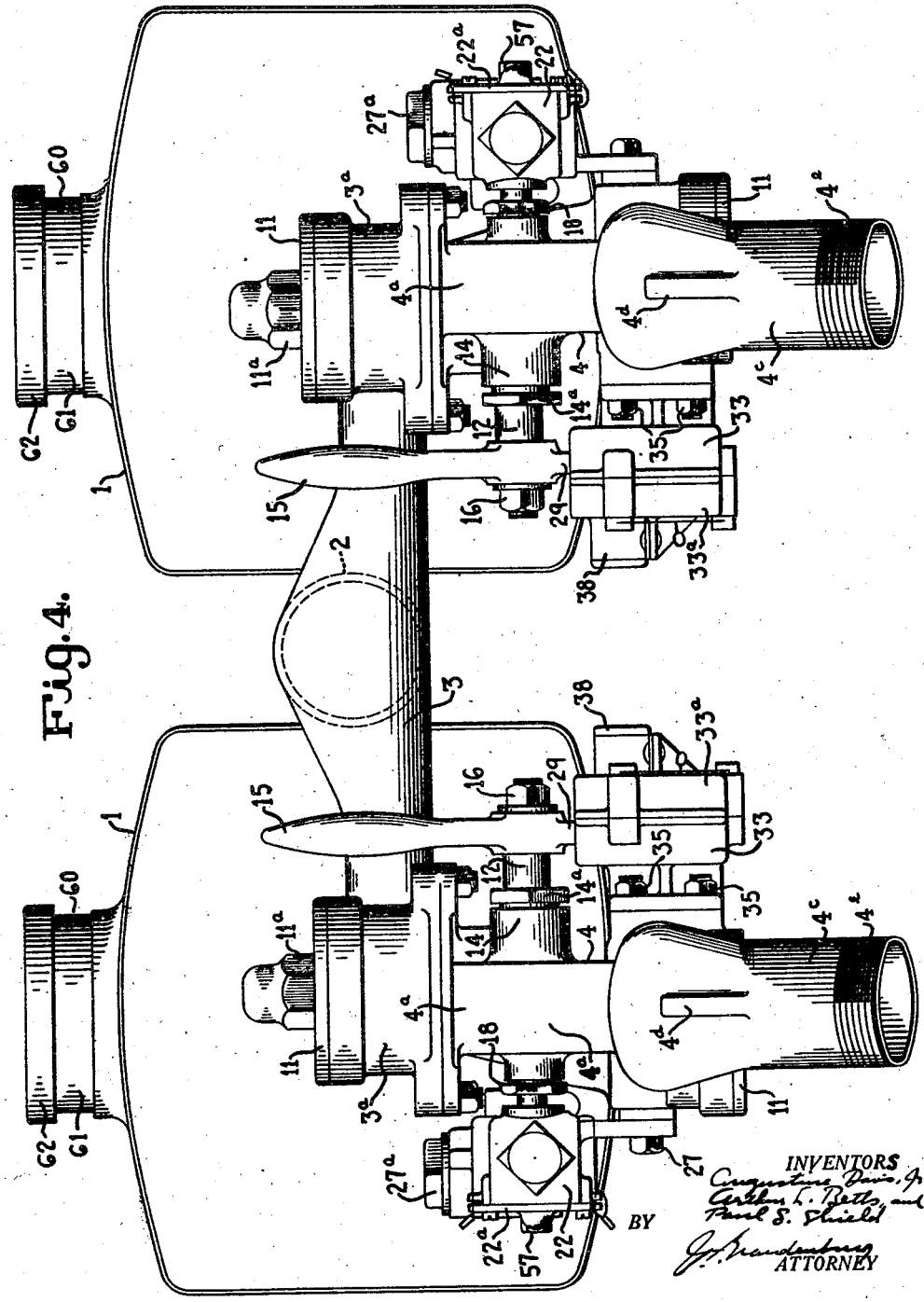

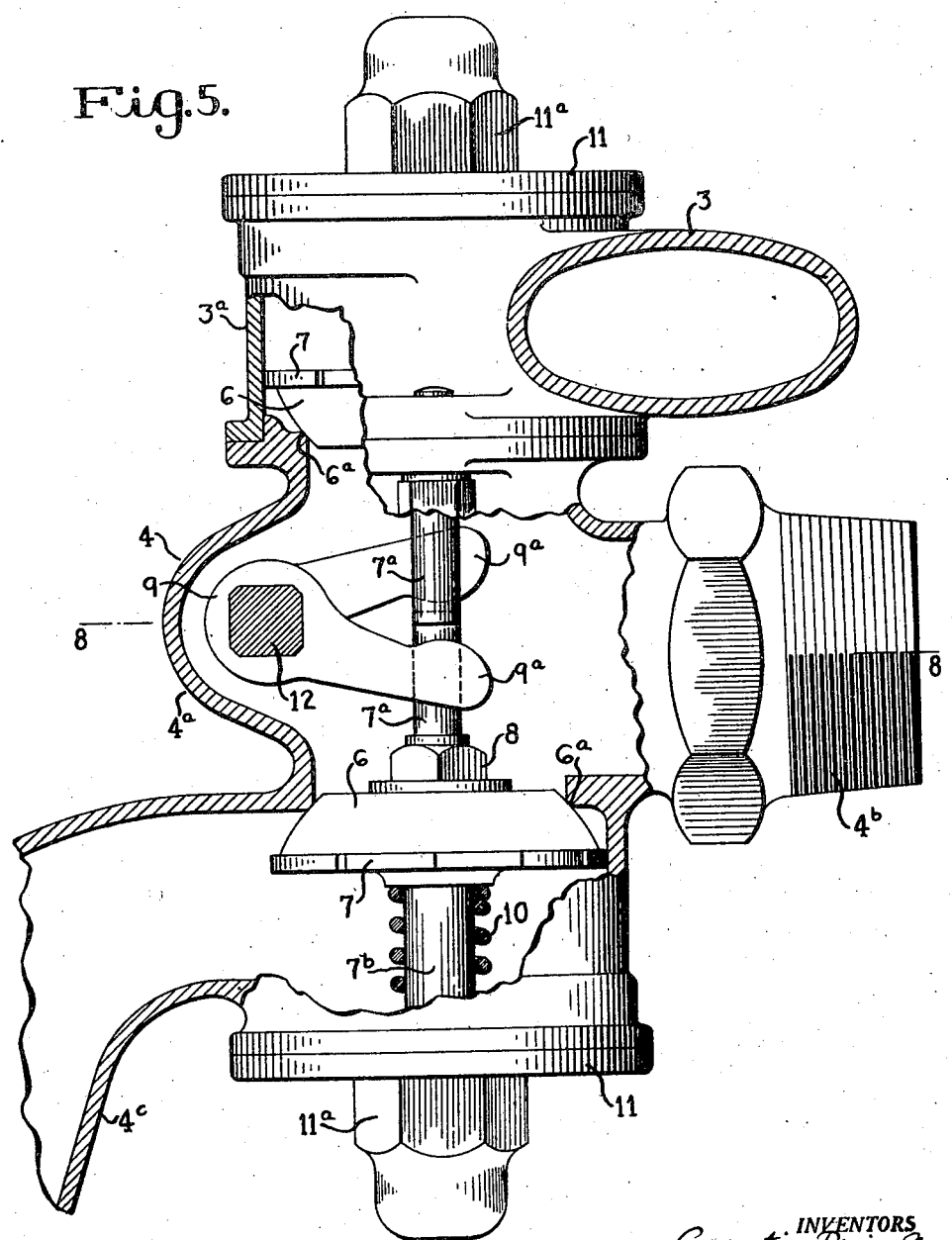

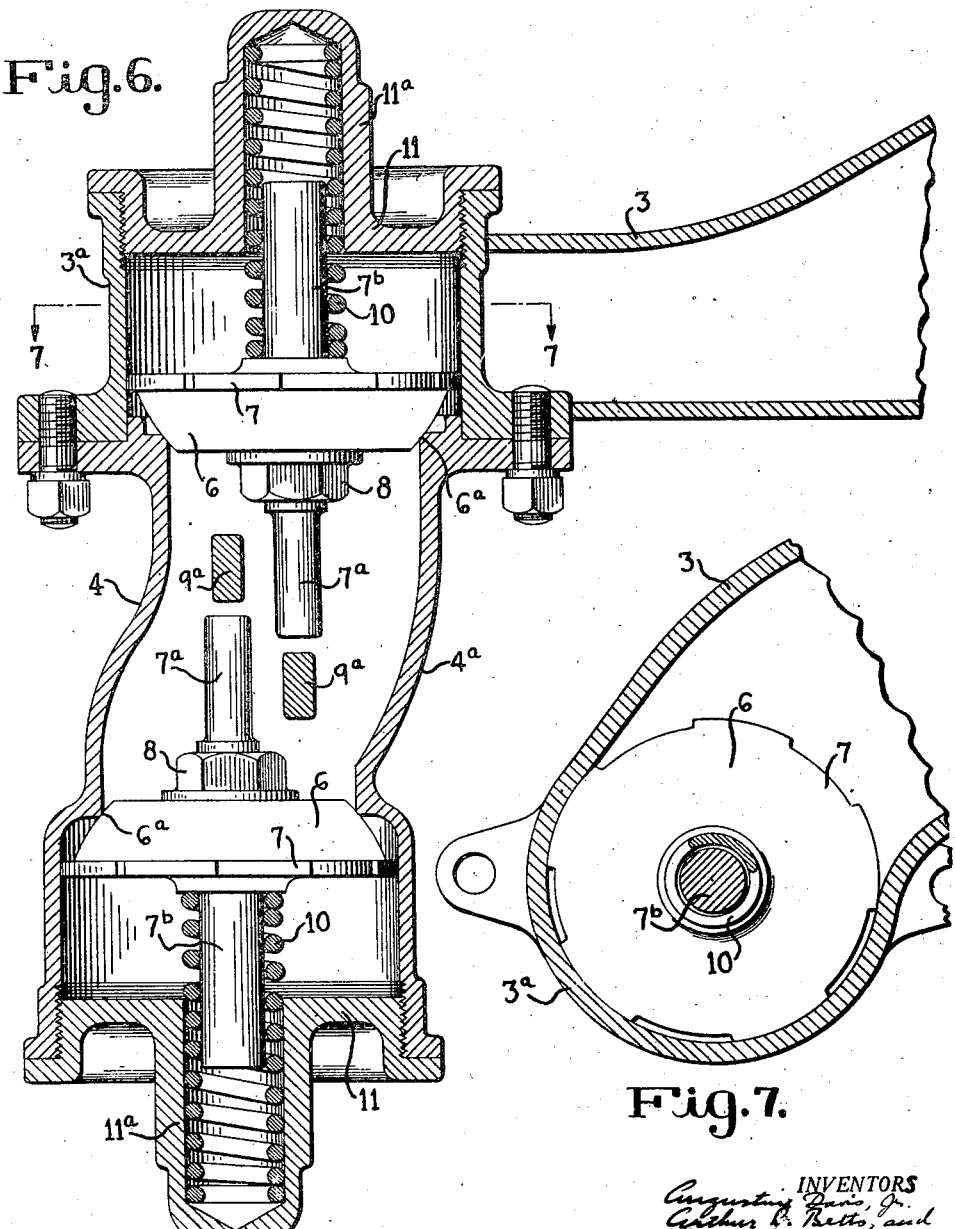

May 27, 1924.

A. DAVIS, JR., ET AL 1,495,166

LIQUID MEASURING APPARATUS

Filed Sept. 14, 1920     7 Sheets-Sheet 6

INVENTORS
BY
ATTORNEY

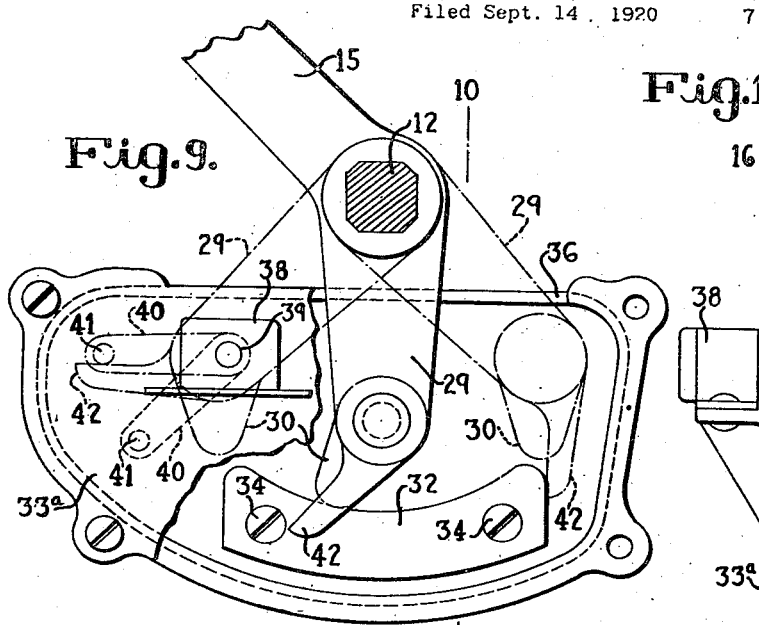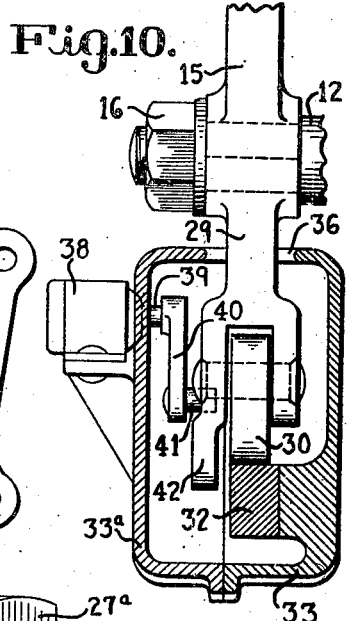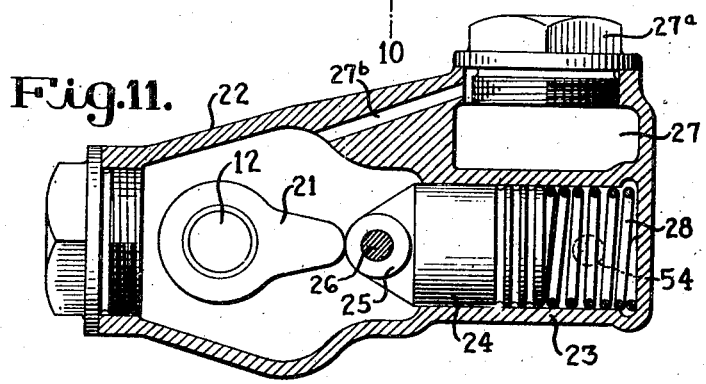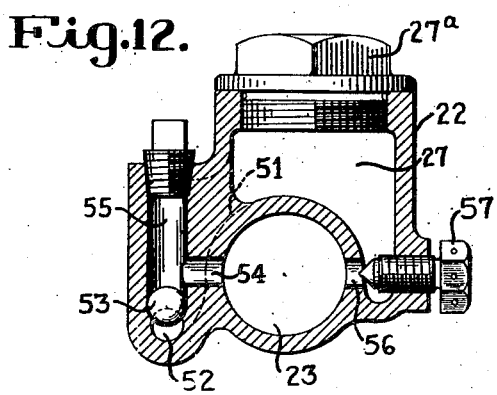

Patented May 27, 1924.

1,495,166

UNITED STATES PATENT OFFICE.

AUGUSTINE DAVIS, JR., OF COVINGTON, KENTUCKY, AND ARTHUR L. BETTS AND PAUL S. SHIELD, OF CINCINNATI, OHIO; SAID BETTS AND SAID SHIELD ASSIGNORS TO SAID DAVIS.

LIQUID-MEASURING APPARATUS.

Application filed September 14, 1920. Serial No. 410,084.

*To all whom it may concern:*

Be it known that we, AUGUSTINE DAVIS, Jr., a citizen of the United States, residing at Covington, in the county of Kenton and State of Kentucky, ARTHUR L. BETTS, a citizen of the United States, residing at Cincinnati, in the county of Hamilton and State of Ohio, and PAUL S. SHIELD, a citizen of the United States, residing at Cincinnati, in the county of Hamilton and State of Ohio, have invented certain new and useful Improvements in Liquid-Measuring Apparatus, of which the following is a specification.

The object of the invention is to provide automatic means of simple, compact and efficient character for measuring exact, equal quantities of liquid from a source of supply, and the invention is particularly useful in connection with, though not necessarily confined to, tank-vehicles, such as oil-tank wagons and trucks, from which oil and gasoline are sold to garages and individual consumers. Further objects are to insure complete filling and discharge of the measuring container forming part of the apparatus, and to safeguard the apparatus against faulty operation and tampering. With these and other objects in view, the invention may be said to comprise the parts, improvements and combinations hereinafter described in the preferred embodiment and more particularly set forth in the appended claims.

In the drawings forming a part hereof:

Figure 1 is a plan view;

Fig. 2 is a side sectional elevation showing one of the operating handles in normal position in full lines and in its two operating positions in dotted lines;

Fig. 3 is a fragmentary plan view on a smaller scale illustrating a combining connection;

Fig. 4 is a rear elevation;

Fig. 5 is a side elevation of one of the valve body parts with portions of the casing broken away and in section;

Fig. 6 is a vertical section on the irregular line 6—6 of Fig. 1;

Fig. 7 is a horizontal section on the line 7—7 of Fig. 6;

Fig. 9 is an elevation of one of the full-stroke mechanisms, with a portion of the casing broken away, showing the normal position in full lines and two operating positions in broken lines;

Fig. 10 is a vertical section on the line 10—10 of Fig. 9;

Fig. 11 is a vertical longitudinal section through one of the dash-pot timing devices; and Fig. 12 is a vertical cross-section on the line 12—12 of Fig. 8.

Figure 8:
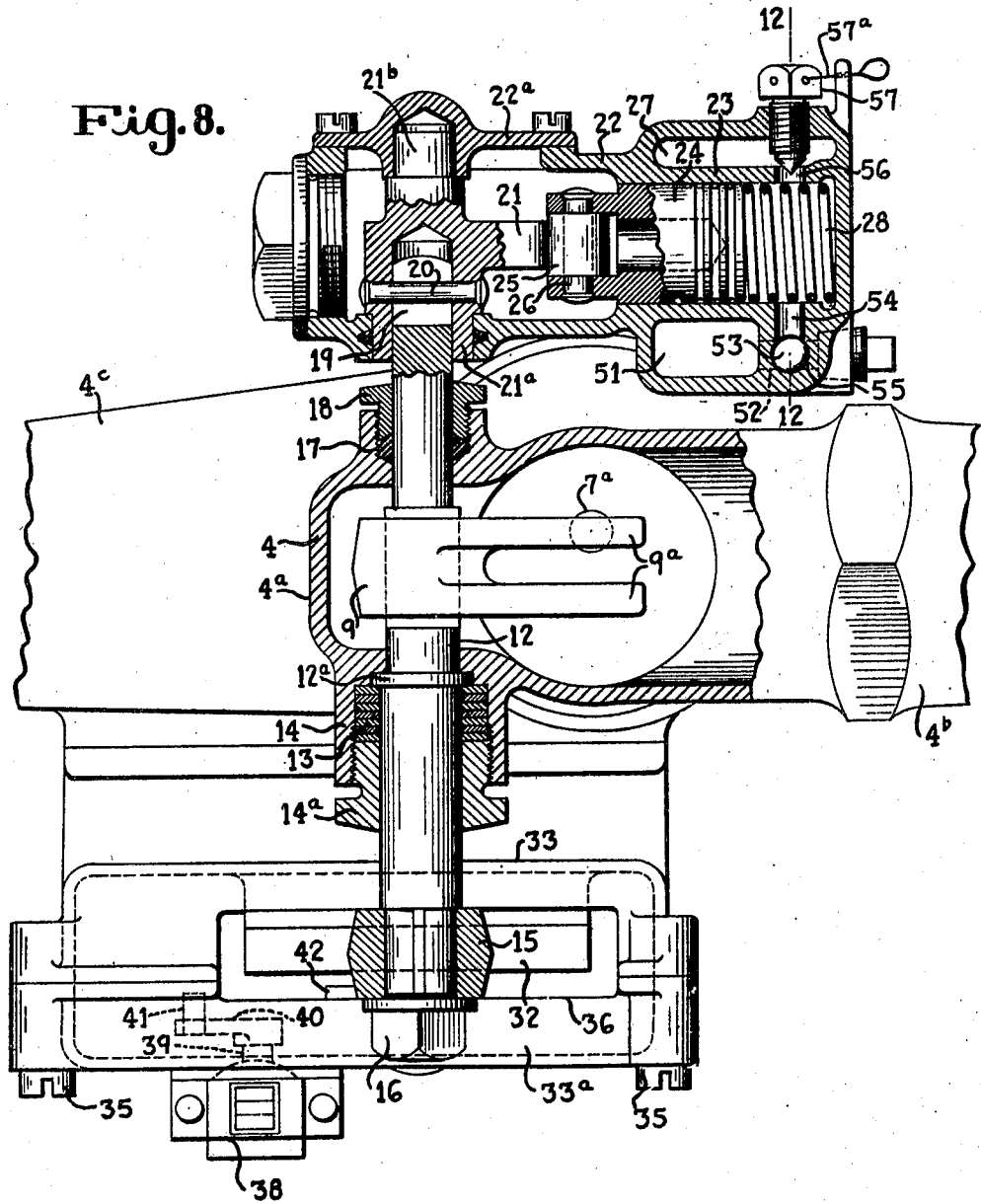
Fig. 8 is a horizontal section on the line 8—8 of Fig. 5.

In its preferred complete embodiment the invention comprises a pair of twin measuring tanks or containers 1, which, in the case of a tank-vehicle, will be mounted side by side at the rear end of the vehicle below the bucket-box. These containers are supplied from the pipe 2, which may be understood as extending from the main tank, and a transverse manifold 3, which is adjacent the rear ends of the containers. At its opposite ends, downwardly-extending inlet and outlet casings 4 are connected with the manifold, each of said casings comprising in the preferred construction a vertically-disposed cylindrical section $3^a$ formed with the manifold and a valve body $4^a$ applied to the bottom of said cylindrical section.

Substantially oppositely-disposed valve seats $6^a$ are formed in the upper and lower portions of the valve body $4^a$. At the front, each valve body has a single horizontally-disposed connection $4^b$, which screws into a combined inlet and outlet opening 5 in the bottom of the rear end wall of the corresponding container, said connection $4^b$ being between the valve seats $6^a$. Below the lower valve seat $6^a$ and at the rear of each valve body is a discharge spout $4^c$. These spouts have hooks $4^d$, on which to hang buckets, and are screw-threaded at the ends, as indicated at $4^e$, for the application either of covers or of a combining connection $4^g$ (Fig. 3).

Cooperating with the valve seat $6^a$ are oppositely vertically-acting valves 6, of which the upper valve opens upwardly and the lower valve downwardly. Each valve preferably comprises a composition valve disk and a valve stem casting 7, to which the disk is attached by a nut 8, the edge of the back portion of said casting being projected beyond the periphery of the valve disk and machined so as to be guided in a cylindrical section $3^a$ of the manifold or the corresponding lower portion of the valve body, as the case may be. Each valve stem has a portion 7$^a$ projecting inwardly from its valve and another portion 7$^b$ projecting outwardly therefrom within the spring chamber 11$^a$ of a removable cover 11, said covers being screwed into the wide-mouthed upper and lower ends of the casings 4 so as to afford means for ready removal of the valves. A compression spring 10 is disposed around the valve stem of each valve and within the spring chamber, for closing its valve. In each casing both the inlet, or upper, and the outlet, or lower, valves are normally closed.

The rear intermediate portion of each valve body 4$^a$ is formed to accommodate a transverse rock-shaft 12, which passes in opposite directions through bearings in both sides of the body. At one side the rock-shaft passes through a gland 14, packing 13, and gland nut 14$^a$, said nut serving also to hold the shaft against endwise movement by co-operating through the packing with a flange 12$^a$ on the shaft. The projecting end of the shaft at this side is squared to receive an operating or hand lever 15 retained in place by a nut 16. The other portion of the shaft passes through a packing space 17 and packing nut 18, and its end is slotted at 19 and projects within an annex casing 22, which is attached to the body by screws 22$^b$.

The intermediate portion of each of the rock-shafts bears a hub 9, from which project laterally offset arms 9$^a$, inclining upwardly and downwardly, respectively, in the normal neutral position, so as to project across the inner ends of the respective valve stems. The said valve stems, it will be noted in Fig. 6, are correspondingly laterally offset, the valves and valve seats being also rendered slightly out of alinement by laterally deflecting the valve bodies 4$^a$.

The slotted end of the rock-shaft 12 within the annex casing 22 is operatively connected with a dash-pot cam 21 having journal portions 21$^a$, 21$^b$ mounted to turn in bearings in the side wall of said casing and its removable cover 22$^a$. The journal portion 21$^a$ is hollow to receive the end of the shaft and is provided with a transverse pin 20 passing through the slot 19. In this way driving connection is afforded without necessity for exact alinement, and the dash-pot mechanism is made readily removable through the opening closed by the cover 22$^a$. In the normal condition, that is to say with both the inlet and the outlet valve closed, the cam 21 is on dead center with the dash-pot plunger 24. Said plunger works in a cylindrical chamber 23 of the annex casing, and its rear end bears a cam roll 25 on a pin 26 to cooperate with the cam 21. The plunger is normally pressed outward toward the cam by a spring 28 in its chamber.

An oil reservoir 27 is formed in the upper part of the annex casing 22, and provided with a removable closure 27$^a$. Oil from this reservoir can pass freely into the dash-pot chamber 23 through a cored passage 51, seen in Fig. 8, drilled hole 52, lifting ball check-valve 53, and drilled holes 55, 54. When the dash-pot plunger is forced inward by the cam the oil cannot return through this path, because of the check valve, and instead must escape through a restricted timing opening 56, the area of which is regulable by a screw 57, and thus back into the reservoir. The screw 57 is locked against tampering by a seal 57$^a$. An air passage 27$^b$ connects the top of the chamber 27 with the cam chamber.

At the other side of each of the valve bodies is another annex casing 33 secured to the body by screws 35 and having a removable cover 33$^a$. A sub-arm 29 on the operating lever 15 projects downward through a slot 36 at the top of this casing, within which it bears a pivoted pawl 30. Said pawl is adapted to trail along the incurved upper surface of a steel track 32, which is fixed by screws 34 in the casing. In the normal condition this pawl rests upon an intermediate portion of the track and permits initial movement in one direction only, movement in the reverse direction being prevented by the friction between the pawl and track tending to straighten the toggle constituted by the arm 29 and pawl 30 and thus thrusting the pawl against the track. Thus, in Fig. 9, the operating lever is movable from normal position in the direction to cause the pawl to travel to the right, which operation causes opening of the inlet valve, the outlet valve remaining closed. A full stroke must be effected, carrying the pawl 30 to the right-hand end of the track, because, if the handle is released at a point short of the end, the action of the spring 10 seeking to close the inlet valve will jam the pawl against the track and the valve mechanism will remain stationary. When the pawl has passed beyond the end of the track, however, it is free to swing so as to trail in the opposite direction, whereupon the spring of the inlet valve will cause the valve to close and the operating lever to return to mid-position, thus carrying the pawl to the intermediate region of the track 32. Because of the inclination of the pawl, the operating lever can now be moved only in the direction which will cause the pawl to travel to the left in Fig. 9, and a full stroke in this direction to open the outlet valve is compelled for the same reason as in the case of the inlet valve opening. When now the handle is released, the spring of the outlet valve closes it and restores the handle once more to neutral position with the pawl 30 inclined in the position which it always assumes in the normal condition. The dog or pawl 30 because of its cooperation with the track constitutes an automatic reversing device which permits movement at each operation only in one direction from neutral, the directions alternating at each operation.

The sub-arm 29 also has a projection 42 at one side of the track 32, which toward one extreme of movement encounters and displaces a lateral pin 41 carried by a crank arm 40 on the shaft 39 of a mechanical counter 38, which is supported upon the outside of the cover 33ª, the shaft passing through said cover.

It will thus be perceived that full-stroke means are provided for compelling full opening of the inlet and outlet valves and that timing means are also provided for determining the time which will be required for the valve springs to return the valves to closed position through the distance through which they have been opened; also that means are provided whereby the valves can be operated only in the proper order. Consequently complete filling and complete discharging of each receptacle is insured and the operator is prevented from intentionally or otherwise opening both the inlet and outlet valves at the same time, or from moving the operating lever in any but the proper direction at each operation.

The mechanism which has been described is, of course, duplicated in respect to both of the measuring containers. While the preferred embodiment of such mechanism has been described in detail and is deemed particularly advantageous, it will be understood that the form and arrangement of parts may be widely varied. All parts of the mechanism controlling measuring and recording which might be tampered with by a dishonest driver are secured with lock wires and sealed.

Returning to the measuring containers 1, constituting important elements of the apparatus, it is to be understood that each of these containers is designed to hold an exact known quantity of liquid—in this instance preferably five gallons, though other capacities may be used. A further important feature of the tanks is that they are so formed as to be filled without formation of air pockets and to drain completely under any condition of lateral or fore and aft tilting which is to be anticipated in their use. To this end the bottom of each measuring container slopes from the front end to the opening 5 at the foot of the rear end wall of the container, and transversely the bottoms are troughed or slope from both sides to the center. The tops of the tanks are transversely arched and slope upward from the front end to the rear end, where venting means 60 are provided for permitting escape of air while the tanks are being filled and admission of air thereto while the measured quantities are going out. In the particular construction illustrated each of the vents comprises a cylindrical body 61 secured in an opening in the highest part of the top of the tank, the bottom of this body being open to the interior of the tank and its top being provided with a screw cover-ring 62 bearing a fire-screen 63. The under side of said cover, around its central opening 64, is formed with an annular valve seat 65, the cover 62 thus constituting a removable valve seat member. Said valve seat cooperates with a valve disk 66 carried by a float 67, to which it is secured by a bolt 68 and nut 69. This float normally rests upon an inturned bottom flange 70 of the body 61, and has substantial freedom of movement within the chamber afforded by said body. The valve disk 66 is of sufficiently larger diameter than the seat 65 and sufficiently self-adjusting to close tightly on said seat when the liquid rises, under any ordinary condition of tilting. The disk 66 is preferably of soft rubber, but other forms and constructions of float-operated valve may be employed and the valve need not, of course, necessarily be carried by the float. The function of such float-operated valve is to close the vent when the measuring vessel has been filled to its predetermined capacity, thus preventing overfilling or loss of gasoline, though the inlet valve continue to remain open for a time longer. Conversely, of course, the descent of the float when the outlet valve is open permits air to enter the vessel to take the place of the outflowing liquid.

The operation will be briefly reviewed. In order to fill one of the measuring vessels 1, the operator depresses the corresponding handle 15 from its normal inclined position to a substantially horizontal position. This raises the valve-operating arms 9ª, causing the lower arm to raise the upper or inlet valve 6 from its seat, while the upper arm 9ª recedes from the stem of the lower or outlet valve 6, so that this valve remains closed. Liquid now passes from the source of supply through the manifold 3 and casing 4 and its connection 4ᵇ into the measuring container. Full operation of the valve mechanism by the handle is compelled by the full-stroke mechanism 29, 30 and 32. The operator now releases the handle and the inlet valve spring commences to close the valve, the closing, however, being retarded in a predetermined manner by the dash-pot 23, 24, the adjustment of which is such that the valve cannot seat until after the measuring container has been completely filled. At this time the operating lever is again in mid-position, but the full-stroke pawl 30 is tilted reversely to its normal condition, so that in the next operation the handle can be moved only in the direction to open the outlet valve, the inlet valve remaining closed. Thus, in the particular construction illustrated, the operator pushes the handle upward to a substantially vertical position and there releases it. Full-stroke operation in this direction is compelled, as before, by the duplex full-stroke mechanism, and the dash-pot again operates in the same manner to delay the seating of the outlet valve by its spring for a sufficient period to insure the delivery of the entire contents of the container. The operating handles 15 of the two measuring containers can be operated either simultaneously and similarly or alternately. Thus, both inlet valves may be opened at the same time, filling the two measuring tanks simultaneously. The two tanks are then emptied into carrying cans, and as soon as these are filled the inlet valves are again opened, allowing the measuring tanks to refill while the driver is carrying his load to the customer's storage tank. Thus, there will be two measuring tanks full and ready to empty into the carrying cans when the driver returns. Or, if the driver carries only one can at a time, one tank may be filling while the other is emptying into one of the cans, thus allowing the driver to spend substantially his entire time in carrying and emptying the contents of the cans into the storage tank. When it is advantageous to use a hose to run the gasoline directly into a storage tank, a combining connection 4ˣ, such as seen in Fig. 3, will be employed. This connection is preferably a special hose having two inlet terminals with couplings, whereby they are attached to the spouts. Under such circumstances the driver operates the two sides of the apparatus alternately, causing one of the measuring tanks to fill while the other is discharging into the hose. This causes a constant stream to flow through the hose into the storage tank. In any event each complete operation of either half of the measuring apparatus is registered upon its counter 38, so that a reliable check is obtained upon the total of quantities delivered.

What is claimed as new is:

1. Means for measuring quantities of liquid from a supply, comprising the combination of a measuring container designed to hold a definite quantity and having an inlet and an outlet from which the liquid flows by gravity, manually-opened self-closing valve mechanism, full-stroke means insuring full opening movement of the valve before the valve can be closed and means operatively connected with said valve mechanism so as to protract the duration of the closing movement sufficiently to insure the passage of the predetermined quantity of liquid.

2. Means for measuring quantities of liquid from a supply, comprising the combination of a measuring container designed to hold a definite quantity and having an inlet and an outlet from which the liquid flows by gravity, self-closing valves and valve mechanism normally in neutral position closing both inlet and outlet, means insuring full opening of both valves before they can be closed, and means for retarding the return of the valve mechanism to neutral.

3. Means for measuring quantities of liquid from a supply, comprising the combination of a measuring container designed to hold a definite quantity and having an inlet and an outlet from which the liquid flows by gravity, valves therefor having a common operating lever to effect opening, spring means normally closing the valves to both inlet and outlet, full-stroke means insuring full opening movement of the inlet and outlet valves before they can be closed and a dash-pot operatively connected with the valve means to retard the closing movement.

4. Means for measuring quantities of liquid from a supply, comprising the combination of a measuring container designed to hold a definite quantity and having an inlet and an outlet, self-closing valves therefor, common operating means separate from the valves, and full-stroke means and a dash-pot connected with the operating means.

5. Means for measuring quantities of liquid from a supply, comprising the combination of a measuring container designed to hold a definite quantity and having an inlet and an outlet from which the liquid flows by gravity, separate valves for the inlet and outlet, springs normally closing both valves, common operating means normally in neutral position with both valves closed, full-stroke means connected with the operating means, and means for retarding the closing movement of the valves.

6. Means for measuring quantities of liquid from a supply, comprising the combination of a measuring container designed to hold a definite quantity and having an inlet and an outlet, separate self-closing valves for the inlet and outlet, common operating means normally in neutral position with both valves closed, and a dash-pot operatively connected with the operating means so as to retard the return movement from each of the extreme positions.

7. Means for measuring quantities of liquid from a supply, comprising the combination of a measuring container designed to hold a definite quantity and having an inlet and an outlet, separate self-closing valves for the inlet and outlet, common operating means normally in neutral position with both valves closed, a full-stroke dog pivoted to the operating means, and a track for the dog with which the dog cooperates in the neutral position of the operating means and during the movement thereof in each of the opposite directions away from the neutral position.

8. Means for measuring quantities of liquid from a supply, comprising the combination of a measuring container designed to hold a definite quantity and having an inlet and an outlet, separate self-closing valves for the inlet and outlet, common operating means normally in neutral position with respect to the valves, full-stroke means connected with the operating means and operative in both directions from neutral, a dash-pot, and operating connections normally on dead center between the operating means and the dash-pot.

9. Means for measuring quantities of liquid from a supply, comprising the combination of a measuring container designed to hold a definite quantity and having an inlet and an outlet, valve means therefor, a common operating lever, spring means normally closing the valve means to both inlet and outlet, full-stroke means comprising a pivoted dog connected with said lever and a track for the dog; and a counter operated by a moving part of said full stroke means.

10. The combination with a measuring container, of an inlet and outlet casing connected therewith, self-closing inlet and outlet valves in said casing, a rock-shaft passing through the casing and having means therein for alternately unseating the valves, encased full-stroke means connected with one end of said shaft, and dash-pot means connected with the other end of the shaft.

11. The combination with a measuring container, of an inlet and outlet casing connected therewith, self-closing inlet and outlet valves in said casing, a rock-shaft passing through the casing and having means therein for alternately unseating the valves, an operating lever on one end of the shaft having a sub-arm, an annex casing, and full-stroke means in the annex casing connected with said sub-arm.

12. The combination with a measuring container, of an inlet and outlet casing connected therewith and having valve seats substantially in opposite relation, oppositely acting spring-seated valves cooperating with said seats and having stems projecting reversely out of alinement between the valves, and an operating rock-shaft having laterally offset arms cooperative with the respective valve stems.

13. Liquid measuring apparatus comprising, in combination with a measuring container, valve mechanism controlling liquid inlet to and outlet from the container and constructed with an operating lever so as to be movable in opposite directions from a neutral position, in which both inlet and outlet are closed, to open the inlet and outlet respectively, and an automatic reversing device permitting operative movement by the lever in one direction only from neutral at each operation.

14. Liquid measuring apparatus comprising, in combination with a measuring container, valve mechanism controlling liquid inlet to and outlet from the container and constructed with an operating lever so as to be movable in opposite directions from a neutral position, in which both inlet and outlet are closed, to open the inlet and outlet respectively, means for automatically restoring the valve mechanism and lever to neutral position, and an automatic reversing device permitting operative movement by the lever in one direction only from neutral at each operation.

15. Liquid measuring apparatus comprising, in combination with a measuring container, valve mechanism controlling liquid inlet to and outlet from the container and constructed with an operating lever so as to be movable in opposite directions from a neutral position, in which both inlet and outlet are closed, to open the inlet and outlet respectively, a pivoted dog connected with the valve mechanism, and a track arranged to cooperate with said dog whenever the valve mechanism is in neutral position to permit movement thereof only in alternate directions from neutral.

16. Liquid measuring apparatus having a measuring container provided with inlet and outlet for the liquid and adapted to receive and deliver a predetermined quantity, and valve mechanism therefor comprising a valve, a lever for opening the valve, means for automatically closing the same, a full-stroke device insuring full-opening movement of the valve by the lever before the valve can be closed, and a retarding device for protracting the duration of the closing movement sufficiently to insure the passage of the predetermined quantity of liquid to or from the container.

AUGUSTINE DAVIS, Jr.
ARTHUR L. BETTS.
PAUL S. SHIELD.